(12) United States Patent
Yoshida et al.

(10) Patent No.: US 6,468,600 B1
(45) Date of Patent: Oct. 22, 2002

(54) METHOD OF TEXTURING SURFACE OF SUBSTRATE FOR RECORDING MEDIUM

(75) Inventors: Susumu Yoshida, Kawasaki (JP); Yuichiro Itai, Kawasaki (JP); Yoshiharu Kasamatsu, Kawasaki (JP); Toshiro Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/067,013

(22) Filed: Feb. 4, 2002

(30) Foreign Application Priority Data

Jul. 19, 2001 (JP) .................................. 2001-218970

(51) Int. Cl.[7] .................................. B05D 3/06
(52) U.S. Cl. .................. 427/558; 427/128; 427/129; 427/131; 427/132
(58) Field of Search .................. 427/558, 128, 427/129, 131, 132

(56) References Cited

FOREIGN PATENT DOCUMENTS

JP          7-244845          9/1995

*Primary Examiner*—Bernard Pianalto
(74) *Attorney, Agent, or Firm*—Greer, Burns & Crain, Ltd.

(57) ABSTRACT

A method of texturing includes the process of enhancing the hydrophilicity on the surface of a substrate for a recording medium. A texture is then formed on the surface of the substrate with an aqueous slurry in which abrasive grains are dispersed. The surface of the substrate is expected to exhibit an enhanced property of wetness to the aqueous slurry. The aqueous slurry easily spreads over and contacts the surface of the substrate even from the initial stage of the process. The abrasive grains in the aqueous slurry are allowed to uniformly spread over the surface of the substrate. Establishment of the texture can be started on the surface of the substrate at an earlier stage of the process. Even with the abrasive grains of a smaller grain size, a fine and uniform texture of a predetermined surface roughness can be established on the surface of the substrate within a shortened period. Increase in the operating period of abrasion can remarkably be suppressed irrespective of the reduced size of the abrasive grains.

7 Claims, 4 Drawing Sheets

Embodiment

Comparative Example

METHOD OF TEXTURING SURFACE OF SUBSTRATE FOR RECORDING MEDIUM

BACKGROUND OF THE INVENTION

1. Field of the Invention

The present invention relates to a recording medium such as a magnetic recording disk incorporated within a storage device such as a hard disk drive (HDD), for example. In particular, the invention relates to a method of forming a texture on the surface of a substrate for the recording medium.

2. Description of the Prior Art

A method of texturing is often employed to form a magnetic recording disk incorporated in a hard disk drive (HDD), as disclosed in Japanese Patent Application Laid-open No. 7-244845. The method of texturing employs an abrasive tape urged against the surface of a disk-shaped substrate which rotates around a rotation shaft. An abrasive slurry containing abrasive grains is supplied to the abrasive tape. The abrasive grains sticking onto the abrasive tape scratch the surface of the substrate so as to form a texture on the surface of the substrate. A magnetic layer is thereafter formed over the textured surface of the substrate. The magnetic recording disk is thus obtained. The texture serves to prevent a head slider from adhering to the magnetic recording disk in a hard disk drive. At the same time, the texture contributes to establishment of the magnetic anisotropy in the magnetic layer. A higher recording density can be expected.

A further improvement in the recording density requires a fine texture on a magnetic recording disk. The abrasive grains of a smaller size should be contained in the abrasive slurry so as to establish the fine texture. However, if the grain size of the abrasive grains gets smaller, the efficiency of abrasion remarkably drops. It takes a longer time to establish a uniform texture of a specific roughness over the surface of the substrate. It leads to deterioration of the productivity of the magnetic recording disks.

SUMMARY OF THE INVENTION

It is accordingly an object of the present invention to provide a method of texturing the surface of a substrate for a recording medium, which contributes to establishment of a fine texture within a shortened operating time.

According to a first aspect of the present invention, there is provided a method of texturing a substrate for a recording medium, comprising: enhancing hydrophilicity on a surface of the substrate; and forming a texture on the surface of the substrate with an aqueous slurry in which abrasive grains are dispersed.

Since the hydrophilicity is enhanced over the surface of the substrate, the surface of the substrate is expected to exhibit an enhanced property of wetness to the aqueous slurry. The aqueous slurry easily spreads over and contacts the surface of the substrate even from the initial stage of the process. The abrasive grains in the aqueous slurry are reliably allowed to uniformly spread over the surface of the substrate. When the aqueous slurry is supplied onto the surface of the substrate, establishment of the texture can be started on the surface of the substrate at an earlier stage. Even with the abrasive grains of a smaller grain size, a fine and uniform texture of a predetermined surface roughness can be established on the surface of the substrate within a shortened period. Increase in the operating period of abrasion can remarkably be suppressed irrespective of the reduced size of the abrasive grains.

On the other hand, if a higher repellency is maintained over the surface of the substrate, the abrasive grains hardly touch the repellent surfaces of the substrate. It takes a longer time to start establishing the texture on the substrate. This becomes prominent as the grain size of the abrasive grains gets smaller. A conventional texturing process thus suffers from a remarkable drop in the efficiency of abrasion as the grain size of the abrasive grains gets smaller. It takes a still longer time to establish a fine and uniform texture of a predetermined surface roughness on the substrate. The operating period of abrasion remarkably increases. The productivity of the recording media gets deteriorated.

Exposure of the substrate to ozone gas is effective to enhance the hydrophilicity. The ozone gas is expected to promote the reaction of oxidation over the surface of the substrate. The oxidation serves to enhance the hydrophilicity of the substrate.

In order to generate ozone gas, an ultraviolet ray may be radiated to the substrate in an oxygenic atmosphere. The ultraviolet ray serves to generate ozone molecules out of oxygen molecules. In this case, the ultraviolet ray may have the wavelength equal to or smaller than 200 nm, for example. The ultraviolet ray of this type is supposed to promote generation of ozone gas.

The substrate may be covered with an NiP layer spreading over the surface of the substrate. Otherwise, the abrasive grain in the aqueous slurry may have a grain size equal to or smaller than 1.0 $\mu$m, for example.

According to a second aspect of the present invention, there is provided a method of texturing a substrate for a recording medium, comprising: enhancing property of wetness to a predetermined liquid on a surface of the substrate; and forming a texture on the surface of the substrate with a slurry in which abrasive grains are dispersed in the predetermined liquid.

Since the surface of the substrate is expected to exhibit an enhanced property of wetness to the predetermined liquid, the slurry including the liquid easily spreads over and contacts the surface of the substrate even from the initial stage of the process. The abrasive grains in the slurry are reliably allowed to uniformly spread over the surface of the substrate. When the slurry is supplied onto the surface of the substrate, establishment of the texture can be started on the surface of the substrate at an earlier stage. Even with the abrasive grains of a smaller grain size, a fine and uniform texture of a predetermined surface roughness can be established on the surface of the substrate within a shortened period. Increase in the operating period of abrasion can remarkably be suppressed irrespective of the reduced size of the abrasive grains. The slurry may be an aqueous slurry, an oleaginous slurry, or the like.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
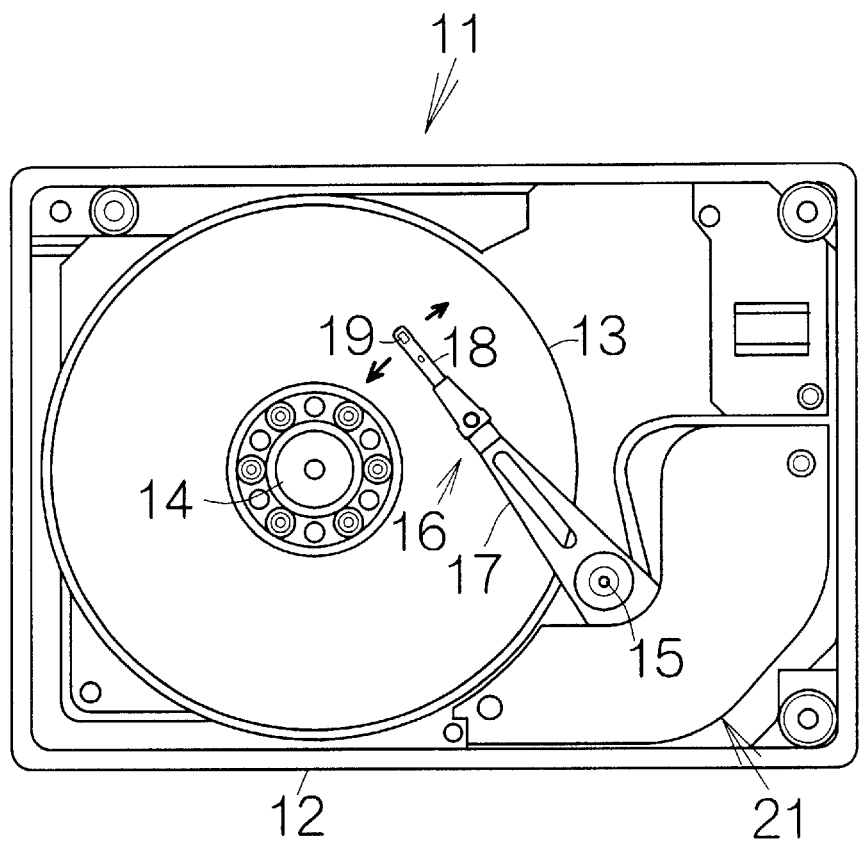
FIG. 1 is a plan view schematically illustrating the structure of a hard disk drive (HDD)

FIG. 1 schematically illustrates the interior structure of a hard disk drive (HDD) 11 as an example of a magnetic recording medium drive or storage device. The HDD 11 includes a box-shaped primary enclosure 12 defining an inner space of a flat parallelepiped, for example. At least one recording medium or magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution rate such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown.

A write head element, not shown, is mounted on the flying head slider 19 for writing information data into the magnetic recording disk 13. A so-called thin film magnetic head may be employed as the write head element, for example. The thin film magnetic head is designed to utilize a magnetic field, induced at a thin film coil pattern, so as to form a magnetic field for recordation at a write gap. A read head element, not shown, is also mounted on the flying head slider 19 for reading information data out of the magnetic recording disk 13. A magnetoresistive head (MR) element may be employed as the read head element, for example. The MR element is designed to detect binary data based on the electric resistance variable in response to change in the direction of the magnetic field or flux acting from the magnetic recording disk 13. The MR element may include a giant magneto resistive (GRM) element, a tunnel-junction magnetoresistive (TMR) element, and the like.

The head suspension 18 serves to urge the flying head slider 19 toward the surface of the magnetic recording disk 13. When the magnetic recording disk 13 rotates, the flying head slider 19 is allowed to receive an airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18. The flying height of the flying head slider 19 may be set approximately in a range between 10 nm and 20 nm, for example. The write head element realizes the writing operation during flight of the flying head slider 19. The read head element also realizes the reading operation during flight of the flying head slider 19.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
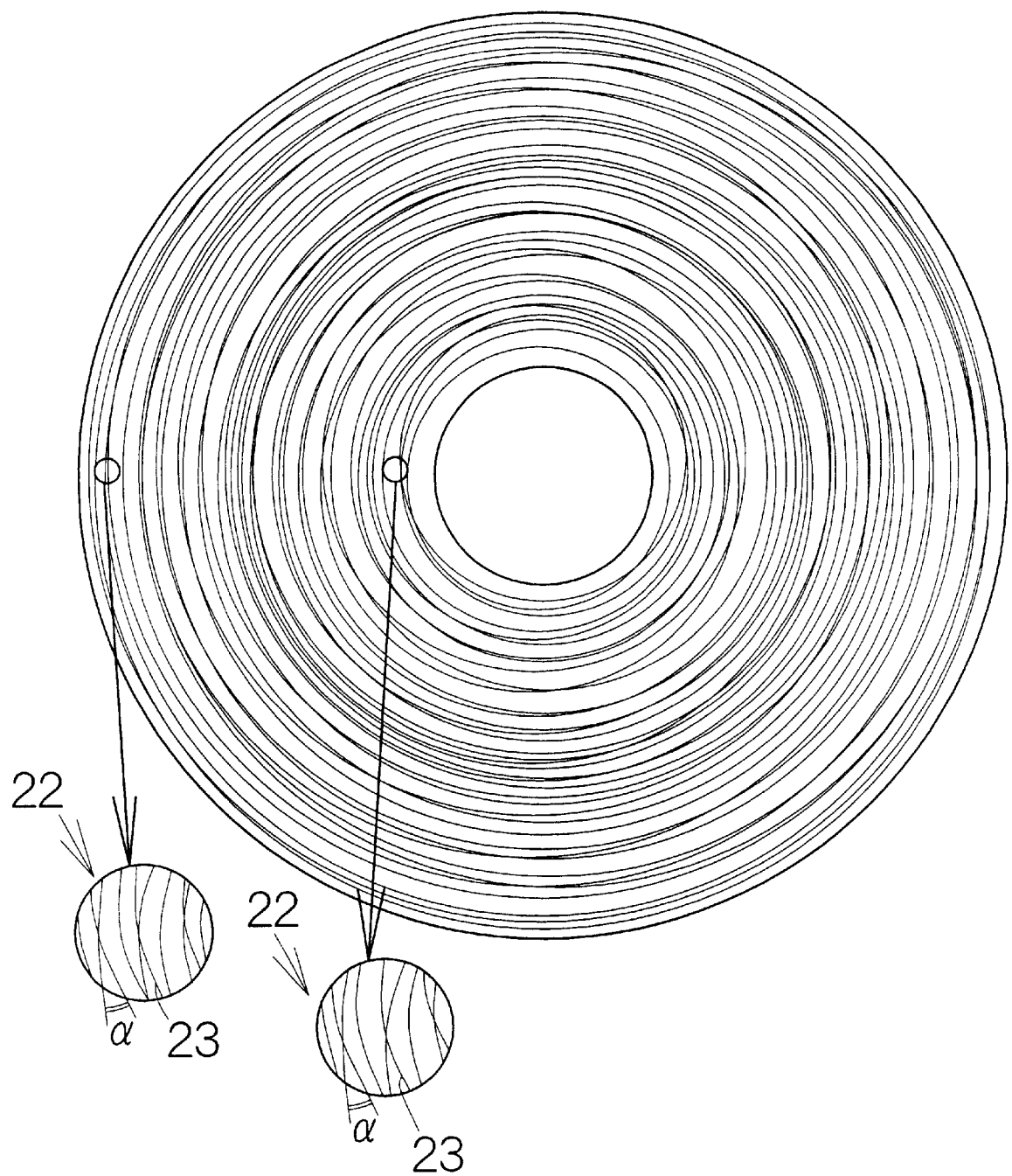
FIG. 2 is an enlarged schematic view illustrating the texture on the surface of a magnetic recording disk.

As shown in FIG. 2, for example, a texture 22 is established all over the surface of the magnetic recording disk 13. The texture 22 comprises stripes of fine scratches 23. A so-called cross angle a can be defined between the scratches 23 crossing each other. The texture 22 serves to establish a surface roughness Ra of a predetermined level over the surface of the magnetic recording disk 13.

Figure 3:
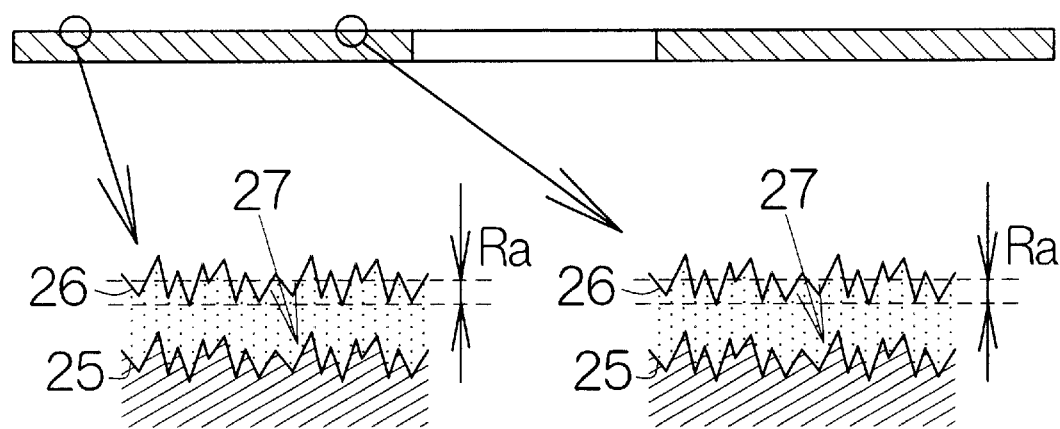
FIG. 3 is an enlarged partial sectional view of the magnetic recording disk.

As shown in FIG. 3, the magnetic recording disk 13 comprises a support member or substrate 25 formed from a metallic material, such as aluminum, or a glass material, for example. The substrate 25 may be shaped into a disk. NiP layers are formed to spread over the front and back surfaces of the substrate 25.

Magnetic layers 26 are formed over the surfaces of the substrate 25 in a conventional manner. Magnetic data is recorded or held in the magnetic layers 26. The magnetic layers 26 may have a uniform thickness all over the substrate 25. The aforementioned texture 22 is the reflection of a texture structure 27 formed over the surface of the substrate 25. A lubricant film, not shown, is formed to spread over the surface of the magnetic layer 26, for example. The lubricant film serves to reduce the friction between the magnetic recording disk 13 and the flying head slider 19.

When the flying head slider 19 contacts the surface of the magnetic recording disk 13, the flying head slider 19 may receive adsorption from the lubricant film spreading over the surface of the magnetic recording disk 13. The texture 22 serves to reduce the adsorption. Accordingly, even if the flying head slider 19 falls on the magnetic recording disk 13 which stands still, the magnetic recording disk 13 reliably starts rotating. On the other hand, if the surface roughness Ra is not established enough on the surface of the magnetic recording disk 13, a larger adsorption between the flying head slider 19 and the magnetic recording disk 13 results in failure in rotating. The magnetic recording disk 13 cannot even start rotating.

Moreover, when the magnetic layer 26 grows along the texture structure 27 on the substrate 25, the magnetic layer 26 is reliably allowed to enjoy the magnetic anisotropy. When the magnetic anisotropy is established enough, the sensitivity of the magnetic recording disk 13 can be enhanced. Even with a magnetic field of a smaller magnitude for recordation, binary data can be written into the magnetic recording disk 13 without an error.

Next, a description will be made on a method of forming the texture structure 27. The substrate 25 is first prepared.

Figure 4:
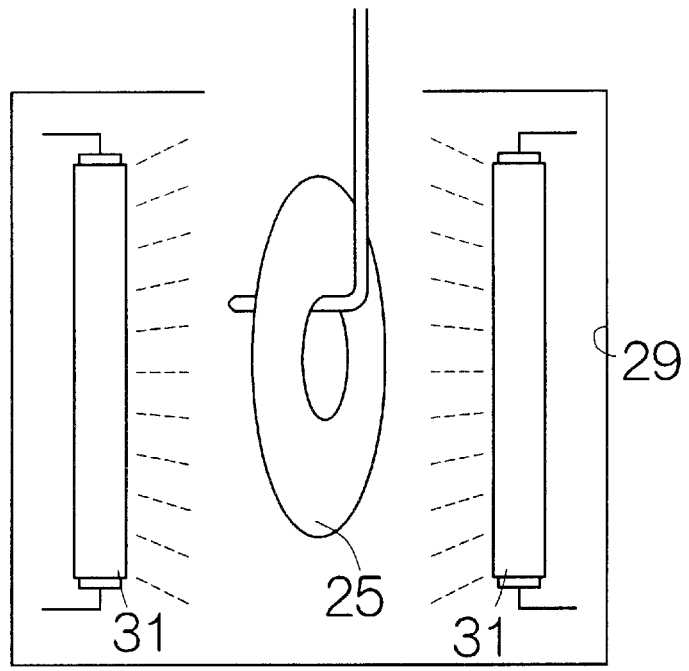
FIG. 4 is a schematic view illustrating the structure of a chamber.

NiP layers are formed on the front and back surfaces of the substrate 25. As shown in FIG. 4, the substrate 25 is brought into a chamber 29 filled with air. Ultraviolet lamps 31 are disposed within the chamber 29. In this case, any oxygenic atmosphere other than air is acceptable in the chamber 29.

Figure 5:
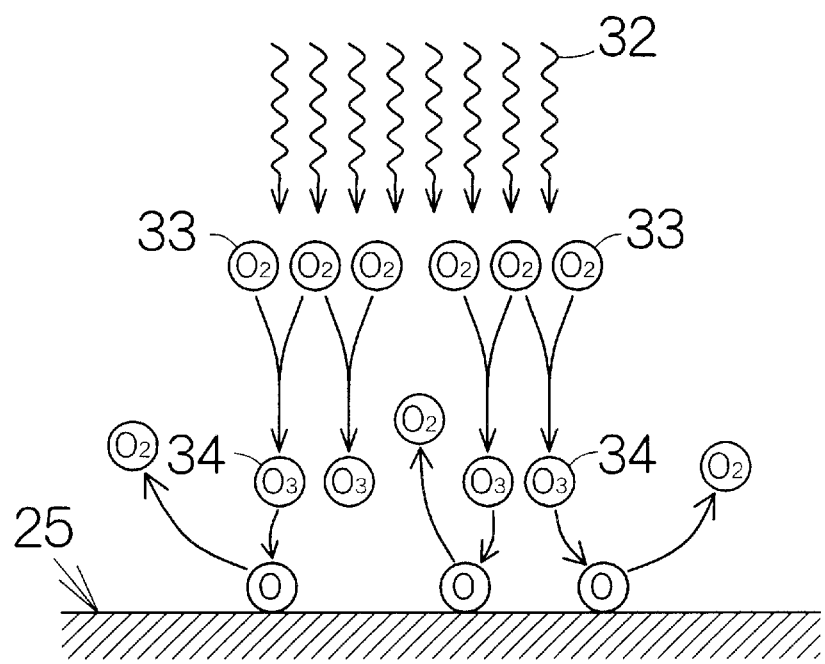
FIG. 5 is a schematic view illustrating the action in the chamber.

As shown in FIG. 5, when the substrate 25 is irradiated with ultraviolet rays 32 from the ultraviolet lamps 31, oxygen molecules 33 are transformed into ozone molecules 34 within the chamber 29. Ozone gas is generated within the chamber 29. The substrate 25 is exposed to the ozone gas. Reaction of oxidation can be promoted on the surfaces of the substrate 25, namely, the surfaces of the NiP layers. Oxidation serves to enhance the hydrophilicity of the substrate 25 or NiP layers. Here, the ultraviolet rays may have the wavelength equal to or smaller than 200 nm, for example. The ultraviolet rays of this type is supposed to promote generation of ozone gas.

Figure 6:
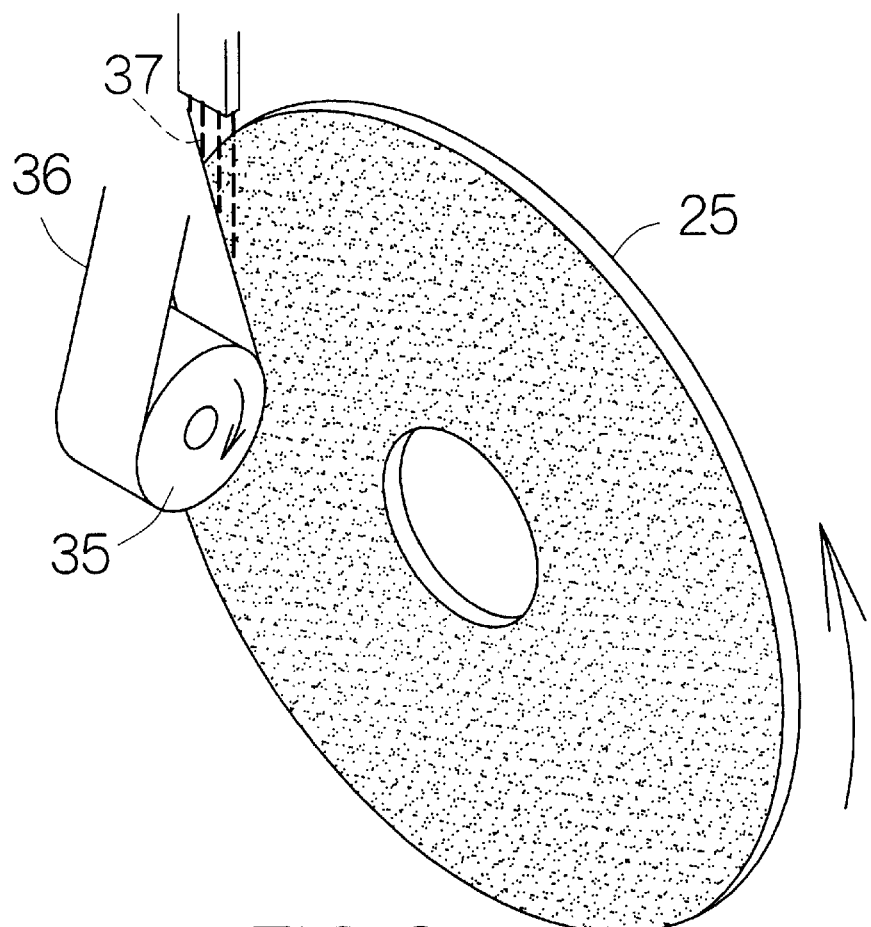
FIG. 6 is a schematic view illustrating a texturing process.

Thereafter, the substrate 25 is subjected to texturing process, as shown in FIG. 6. The substrate 25 is driven for rotation around the center of the disk-shaped substrate 25. An abrasive tape 36 is urged against the surface of the rotating substrate 25 The abrasive tape 36 may be wound around a contact roller 35. An aqueous slurry 37 is supplied onto the abrasive tape 36. The aqueous slurry 37 comprises abrasive grains such as diamond grains dispersed in an aqueous solvent such as water, for example. The abrasive grains in the aqueous slurry 37 serve to form scratches, namely, the texture structure 27, on the surface of the substrate 25.

Since the hydrophilicity of the substrate 25 has been enhanced, the surfaces of the substrate 25 are expected to exhibit an enhanced property of wetness to the aqueous slurry 37. The aqueous slurry 37 easily spreads over and contacts the surface of the substrate 25 even from the initial stage of the texturing process. The abrasive grains in the aqueous slurry 37 are reliably allowed to uniformly spread over the surface of the substrate 25. Establishment of the texture structure 27 can be started on the surface of the substrate 25 at the same time when the aqueous slurry 37 is supplied to the surface of the substrate 25. Even with the abrasive grains of smaller grain sizes, a fine and uniform texture structure 27 can be established on the surface of the substrate 25 within a shortened period. Increase in the operating period of abrasion can remarkably be suppressed irrespective of the reduced size of the abrasive grains. Here, the grain size of the abrasive grains is preferably set equal to or smaller than 1.0 $\mu$m, example.

In general, a higher repellency is established over the surfaces of the substrate 25 or NiP layers. If the aqueous slurry 37 is supplied to the repellent surfaces of the substrate 25, the abrasive grains cannot easily touch the surfaces of the substrate 25. It takes a longer time to start establishing the texture structure 27 on the substrate 25. This becomes prominent as the grain size of the abrasive grains gets smaller. A conventional texturing process thus suffers from a remarkable drop in the efficiency of abrasion as the grain size of the abrasive grains gets smaller. It takes a still longer time to establish a fine and uniform texture structure 27 on the substrate 25. The operating period of abrasion remarkably increases. The productivity of the magnetic recording disks 13 gets deteriorated.

The inventors have made an experiment so as to find out how the hydrophilicity of the substrate 25 is related to the efficiency of abrasion. The substrate 25 was subjected to irradiation of ultraviolet rays having the wavelength of 184 nm in the chamber 29 in the experiment. Radiation of the ultraviolet rays were maintained for 10 seconds. The substrate 25 was subjected to the texturing process after the radiation of the ultraviolet rays. The abrasion process was conducted for three seconds. The grain size of the abrasive grains was set at approximately 0.2 $\mu$m. The inventors also prepared a substrate of a comparative example. The substrate of the comparative example was subjected to the texturing process under the same condition without irradiation to ultraviolet rays. The surface of the substrates were observed with an AFM (Atomic Force Microscope) after completion of the texturing process.

Figure 7A:
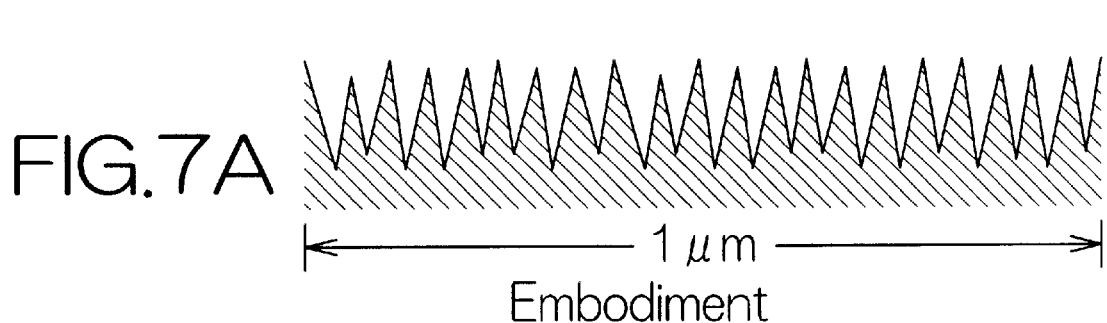
FIG. 7A is a schematic view illustrating an AFM (Atomic Force Microscope) photograph of the surface of the substrate according to the embodiment of the invention.
Figure 7B:
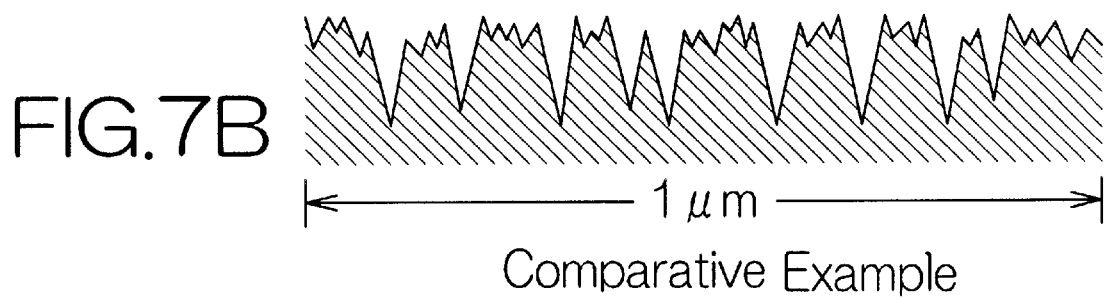
FIG. 7B is a schematic view illustrating an AFM photograph of the surface of a substrate according to a comparative example.

As shown in FIG. 7A, twenty one or more fine scratches were constantly observed per unit length (=1.0 $\mu$m) in the radial direction of the substrate 25 according to the embodiment of the invention. A uniform texture structure 27 has been established on the substrate 25. On the other hand, only ten or less fine scratches could be found per unit length (=1.0 $\mu$m) on the substrate of the comparative example, as shown in FIG. 7B. A fine and uniform texture structure has not completely been established over the substrate of the comparative example.

What is claimed is:

1. A method of texturing a substrate for a recording medium, comprising:

enhancing hydrophilicity on a surface of the substrate; and forming a texture on the surface of the substrate with an aqueous slurry in which abrasive grains are dispersed.

2. The method of texturing according to claim 1, wherein the substrate is exposed to ozone gas in enhancing the hydrophilicity.

3. The method of texturing according to claim 2, wherein an ultraviolet ray is radiated to the substrate in an oxygenic atmosphere.

4. The method of texturing according to claim 3, wherein said ultraviolet ray has a wavelength equal to or smaller than 200 nm.

5. The method of texturing according to claim 4, wherein an NiP layer is formed to spread over the surf ace of the substrate.

6. The method of texturing according to claim 5, wherein said abrasive grain has a grain size equal to or smaller than 1.0 $\mu$m.

7. A method of texturing a substrate for a recording medium, comprising:

enhancing property of wetness to a predetermined liquid on a surface of the substrate; and forming a texture on the surface of the substrate with a slurry in which abrasive grains are dispersed in the predetermined liquid.

* * * * *